United States Patent [19]

Seeley

[11] 4,323,307
[45] Apr. 6, 1982

[54] LIGHT BEAM SCANNING APPARATUS

[75] Inventor: Douglas A. Seeley, High Bridge, N.J.

[73] Assignee: American Hoechst Corporation, Somerville, N.J.

[21] Appl. No.: 157,147

[22] Filed: Jun. 6, 1980

[51] Int. Cl.³ .................. G03B 27/48; G03B 27/50; G03B 27/70
[52] U.S. Cl. .................. 355/51; 350/6.5; 358/293
[58] Field of Search .................. 355/8, 11, 51, 66; 350/6.5, 6.7; 358/206, 285, 293; 250/236, 285, 347, 563; 356/28

[56] References Cited

U.S. PATENT DOCUMENTS

| | | | |
|---|---|---|---|
| 3,487,224 | 12/1969 | Beckmann | 250/236 |
| 3,866,038 | 2/1975 | Korth | 250/236 |
| 4,081,842 | 3/1978 | Harbaugh et al. | 358/293 |
| 4,084,092 | 4/1978 | Runciman | 250/247 |
| 4,230,393 | 10/1980 | Burke | 350/6.5 |

FOREIGN PATENT DOCUMENTS

| | | |
|---|---|---|
| 2306185 | 8/1974 | Fed. Rep. of Germany . |
| 2825550 | 1/1979 | Fed. Rep. of Germany . |
| 1464446 | 2/1977 | United Kingdom ......... 350/6.7 |
| 2053505 | 2/1981 | United Kingdom . |

Primary Examiner—L. T. Hix
Assistant Examiner—Alan Mathews
Attorney, Agent, or Firm—Richard S. Roberts

[57] ABSTRACT

Provided is a laser beam optical scanner apparatus as a component in a system for the scanning of an original and the simultaneous exposure of a light sensitive surface of a printing master with the image of the original for the production of a printing plate. Said apparatus comprises rotating reflective means having at least one planar reflective segment. Said segment defines a tilt angle which is off normal to the axis of rotation of said rotative, reflective means. The system further comprises means for rotating said reflective means about its axis of rotation; means for supporting said reflective means at a position interposed in the common path of a read and write laser beam for deflecting said laser beam into a roof mirror arrangement and for receiving the same beam reflected out of said roof mirror arrangement, to scan a line at an output plane in space. Said roof mirror arrangement includes a first mirror with a first planar reflective surface and a second mirror with a second planar reflective surface. Said first and second mirrors are disposed in fixed positions relative to each other and to the rotating reflective means. Said laser beams are reflected 2n times between said first and said second mirrors and 4n times in said rotating reflective means before the laser beams emerge the optical scanner apparatus, where n is any integer.

19 Claims, 6 Drawing Figures

LIGHT BEAM SCANNING APPARATUS

BACKGROUND OF THE INVENTION

The present invention relates generally to optical scanner systems and more particularly to an optical scanner system for creating a flying spot linear trace of a laser light beam to scan a straight line at an output plane in space. The invention finds particular use in the field of laser beam scanner systems as are used for reading originals on a copy board by a read laser beam and directly transferring the read information to a write laser beam to simultaneously expose a photosensitive surface of a plane to produce a printing plate.

In the art of printing plate technology increased use is made of electronic methods for recording, storing and/or generating information such as by computers, cathode ray tubes, facsimile devices and the like. For example in U.S. patent application Ser. No. 805,445, filed June 10, 1977 now abandoned in favor of Ser. No. 941,763 filed Sept. 13, 1978, entitled OPTICAL SCANNER AND SYSTEM, there is shown an optical scanner apparatus including a rotating pyramid scanning wheel with reflector segments interposed to deflect a laser beam into and out of a doublet mirror roof reflector associated with said scanner wheel. The scanner wheel introduces components of vertical and horizontal angular and translational deviation into the beam. The vertical angular deviation component is cancelled by inversion through the roof reflector while the horizontal angular component is doubled upon the second reflection from the scanner wheel so that the output beam is vertically wobble free and stable while the beam is scanned through the sum of the horizontal angular components introduced by the wheel. The scanner is employed to create a flying spot scan from a laser beam in a photosensitive plate exposure apparatus, one form of which employs superimposed laser read and expose (write) beams of different frequencies which are simultaneously scanned without chromatic aberration, and subsequently separated to read copy and to expose a photosensitive plate surface as in the production of printing plates.

The scanner consists of the roof mirror assembly comprising a first and second mirror disposed relative to each other to define a reflective doublet into which the beams of the read and write laser are deflected by the scanner wheel which is optically coupled to the roof mirror assembly. The scanner wheel has a plurality of planar segments facets arranged in a pyramid shape which progressively rotate about an axis of rotation through the common path of the read and write laser beam causing the same to be deviated.

The beams are deflected by the facets for successive reflection to each surface of the roof mirror assembly one time and for receiving the output of the roof mirror assembly for a second reflection by the same facet from which the beams were first reflected. After the second reflection the beams emerge through a scanner output opening spaced between the first and second mirror of the roof mirror assembly.

The facets are tilted with respect to the axis of the beam path so as to introduce a component of angular horizontal deviation which shifts the beams simultaneously and progressively from one side to the other across the original and plate surface while introducing no component of vertical angular deviation after the second reflection.

In the described system, the read laser beam is scanned over the original at a read platen or copy board to develop a signal which changes in response to sensed reflections from the original. The signal controls a modulator in the write beam laser beam path so as to control its output. The write and read laser beams are superimposed along a common laser beam path and are delivered to the scanner. The scanner introduces a horizontal, angular scan component into the beams while introducing no up and down or vertical angular component. After leaving the scanner, the beams are passed through a field flattening objective lens and are separated by suitable optics for being passed to the respective read platen and exposure platen.

The scanner wheel takes the shape of a triangular regular pyramid cut from a circular disc. Its sides form a plurality of planar reflector segments. The wheel is mounted and driven for rotation about an axis symmetrically passing through the apex of the pyramid so as to bring each segment in turn through the path of the laser beam and to deflect the same by reflection at an angle of tilt of one half of the pyramid angle, which angle causes the planar segment to vary its angles on an orientation input-output reflection surface to the scanner. As each segment rotates through the beam path its varying angular orientation introduces horizontal and vertical components of angular deviation into the beam. The horizontal angular components are doubled upon the second (output) reflection from the wheel segment while the vertical component is cancelled by inversion through the roof reflector doublet. More specifically, as each segment passes through the beam path it is disposed at an angle of tilt with respect to the axis of rotation which is equal to one half the apex angle of the associated pyramid and therefore the segment presents an angle of reflection to the beam which varies through the angle of tilt from side to side. The angle is a maximum when the normal vector of that segment is in alignment with the beam. The angle of tilt changes to a vertical minimum on each side. Simultaneously, the horizontal angle introduced is at a maximum at each side of the segment and is null at the middle. In this way the beam is deviated through twice the horizontal angular component introduced and thence delivered to the field lens for focusing onto the respective planes.

Also, in a system such as disclosed in U.S. patent application Ser. No. 522,103 filed Nov. 8, 1974, now abandoned, entitled LASER READWRITE SYSTEM FOR THE PRODUCTION OF ENGRAVINGS, there is shown an apparatus for producing an exposed photo plate from a copy board paste-up. A laser scanner system having a read laser beam is focused to a spot scanned across the copy board in a predetermined pattern, such as a raster-like scan. The reflection from the copy board is sensed, read and used to control the intensity of a second laser beam via a modulator. The second laser beam is used to impinge upon and scan a photosensitive surface. Both the read laser beam and the write laser beam are scanned through deflection optics and subsequently separated to impinge upon and focus at the copy board and photosensitive surface respectively. In this way there is a resultant exposure of the photosensitive surface in correspondence with the copy. As shown in Ser. No. 522,103 the scanner optics employed utilize a moving mirror galvanometer. Both the read and write laser beams are aligned and superimposed upon each other through suitable beam combining optics and are passed through the galvanometer simultaneously and subsequently separated by suitable beam deflection optics to the respective planes. Another optical system shown therein employs a polygonal scanner wheel having a plurality of surfaces directed outwardly from an axis of rotation of the wheel. The surfaces serve to scan the read/write beams through an angle and thereby create a flying spot scan.

In U.S. Pat. No. 4,081,842 entitled FACSIMILE SYSTEM there is disclosed a variation of laser read/write apparatus in which a facsimile system is developed. As disclosed therein, a duplication of read and write equipment at separate locations can be coordinated to form a facsimile transmission system. At the read station an optical scanner detects the input copy with the scanner spot, and the reflected light produces a video read data signal detected through a spatial mask to provide a transmitter video reference which gates a video read data before transmission. In the receiver a second optical scanner of similar construction is controlled by a video write data signal. The video write data signal gates a scanner spot of exposure laser beam light on and off to expose the output photosensitive copy surface at the receiver. Additionally, the scanner light is detected through a further spatial mask to provide a receiver video reference signal utilized to form a video write signal. The spatial masks in the transmitter and receiver have a known relationship or are identical so that the scanning of the output copy in the receiver can be spatially synchronized with the scanning of the input copy in the transmitter. As therein disclosed, each of the scanner optics includes a galvanometer operated mirror for scanning the incident laser beam back and forth through a horizontal angle.

The foregoing instruments as described in U.S. patent application Ser. No. 522,103, now abandoned, employ a field flattening lens for causing the beam provided from the scanner device to be focused at the plane of the copy board and photosensitive surface respectively and are known therefore as flat bed scanners. The scanner optics using a polygonal drum require very close tolerance during the manufacturing processes so as to control facet to facet tilt. Any error in facet to facet orientation together with bearing run-out errors and the like contribute to produce an angular or positional error component normal to the scan line which has come to be known as wobble or vertical error. Accordingly, the polygon design is expensive to produce due to the tolerances required and the facet to facet error has to be removed by some suitable means which is itself termed a "dewobbler" so as to remove the remaining facet errors.

The resonant or oscillating galvanometer scanner, as described in U.S. Pat. No. 4,081,842, pivots the galvanometer mirror in a sinusoidal manner. Since the scan velocity is non-linear, the more linear center portion of the scan is utilized. In this case, it is necessary to scan back and forth in opposing directions in order to maintain an efficiency level of approximately 50% scan efficiency. Such scanning requires lag compensation accomplished by deviating the read beam as a function of system time delays and scan velocity. Since such lag compensation is largely due to beam position in the write modulator, it creates a system in which the lag can be only partially removed at additional cost. If multiple machines are to communicate in a facsimile system a great deal of calibration of each machine is required to normalize the amount of lag produced in each machine. Lag error or for that matter any error in the facsimile process when scanning in both directions results in left writing and right writing images that are no longer superimposed, resulting in severe image degradation for even small errors. Accordingly, such back and forth opposing direction scan is limited. Further, with the demand for higher speeds particularly associated with facsimile systems, the scanner requirements go beyond galvanometer mirror performance capabilities related to the physical stability and support of a galvanometer mirror when operated at high resonant oscillation speeds since its internal structure must withstand back and forth movement at increasingly high torque.

While other systems exist utilizing curved fields which are cylindrically oriented, such are also limited in the scan efficiency. In one such system for example using a spinner type scanner in a cylindrical configuration, one scan is accomplished for each rotation of the scanning device. When exposure times are computed for a standard format, extremely high rotational speeds are required and synchronization of facsimile versions is difficult. Furthermore, such curved field systems require that the exposure surface be adaptable to a curved conformation which is often incompatible with printing plate production.

SUMMARY OF THE INVENTION

It is an object of the invention to provide an optical scanner apparatus which will overcome the limitations and disadvantages known in the prior art and which combines a system utilizing a rotating element for a resultant scan which eliminates the vertical and horizontal displacement produced by the reflections of coincident laser beams of a read and write laser in the optical scanner assembly, with a flat field scanning, and which simultaneously has good velocity linearity and scan efficiency while operating in a single direction of scan.

It is a further object of the invention to provide a laser beam optical scanner apparatus which reflects the coincident laser beams entering the optical scanner assembly more than once before leaving said assembly.

Another object of the invention is to provide an optical scanner assembly which is free of vertical wobble errors and is entirely reflective so as to avoid aberration errors caused by the read and write laser beam frequencies being at different portions of the spectrum.

These and other objects of the invention are achieved by providing a laser beam optical scanner apparatus as a component in a system for the scanning of an original and the simultaneous exposure of a light sensitive surface of a printing master with the image of the original for the production of a printing plate. Said system comprises rotating reflective means having at least one planar reflective segment. Said segment defines a predetermined tilt angle which is off normal to the axis of rotation of said rotative reflective means. The system further comprises means for rotating said reflective means about its axis of rotation; means for supporting said reflective means at a position interposed in the common path of a read and write laser beam for deflecting said laser beam into a roof mirror arrangement and for receiving the same beam reflected out of said roof mirror arrangement, to scan a straight line at an output plane in space. Said roof mirror arrangement includes a first mirror with a first planar reflective surface and a second mirror with a second planar reflective surface. Said first and second mirrors are disposed in fixed positions relative to each other and to the rotating reflective means. Said laser beams are reflected 2n times between said first and said second mirrors and 4n times in said rotating reflective means before the laser beams emerge the optical scanner apparatus, where n is any integer.

The foregoing and other features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
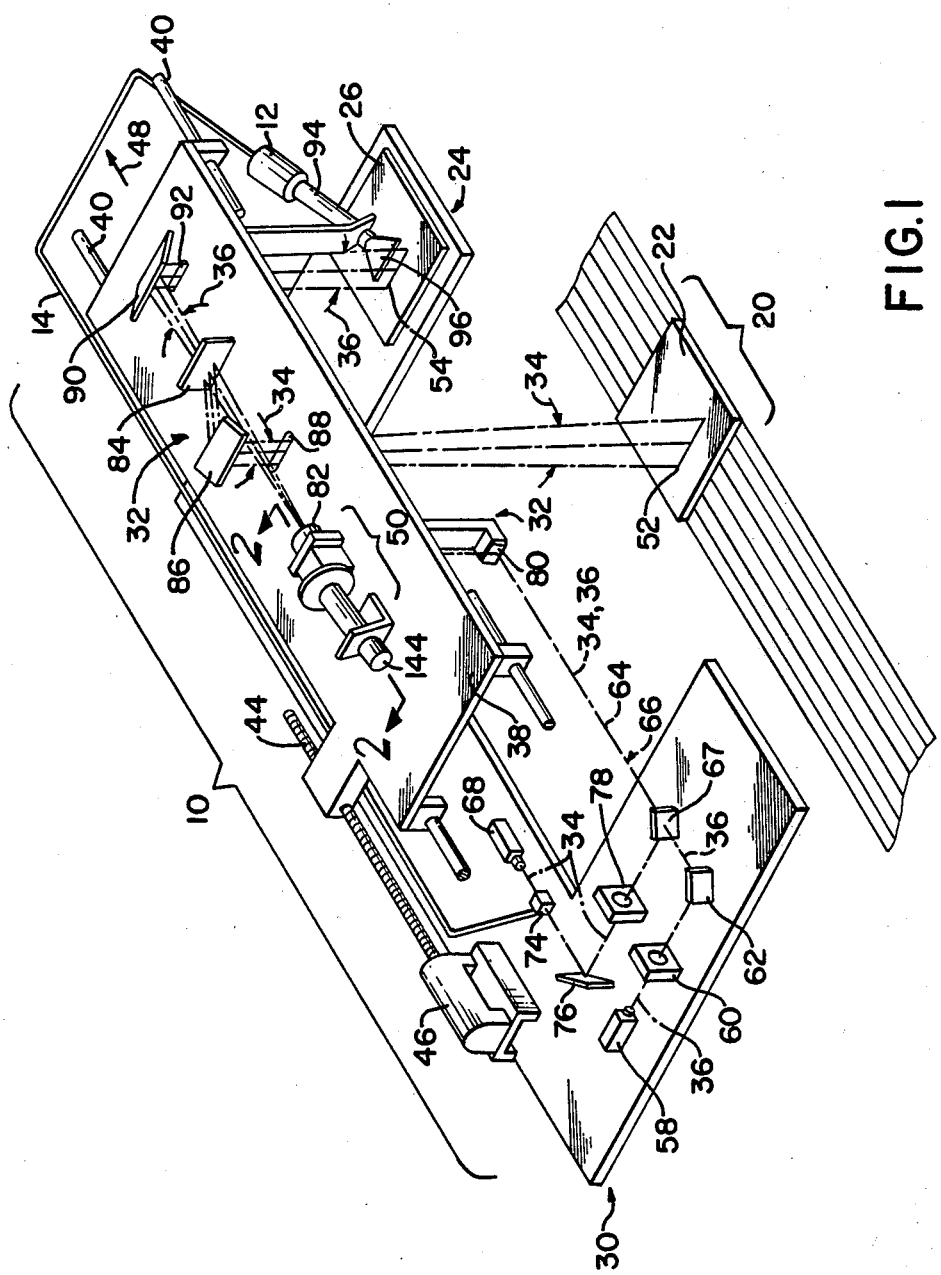
FIG. 1 is a diagrammatic perspective view of laser beam optical scanner apparatus embodying the present invention to show the beam scanner mechanism for reading an original on a read platen and for exposing a photosensitive plate on an exposure platen.
Figure 2:
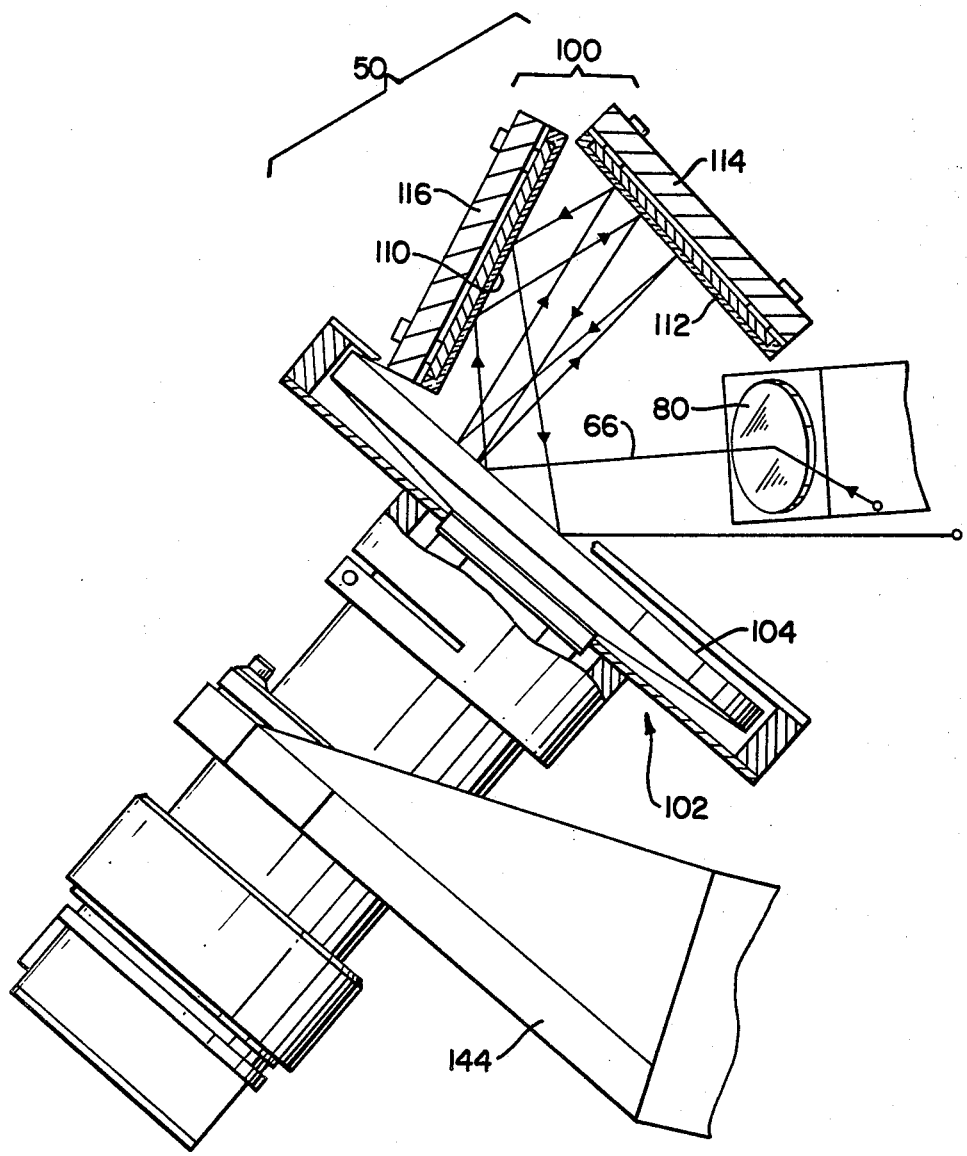
FIG. 2 is an elevational view partly in cross section of the scanner assembly with a planar scanner wheel of the apparatus of FIG. 1 taken along the lines 2—2 thereof.

Referring now to FIGS. 1 and 2 there is shown a laser read/write system 10 which consists generally of a station 20 defining a support for an exposure platen 22 and another station 24 defining a support for a read platen 26. The exposure platen 22 receives a photosensitive plate which will be scanned by the apparatus to be described and exposed thereby for subsequent development into a printing plate. The copy of original to be read is positioned on the read platen 26. A laser beam station 30 is provided the output of which is directed through a scanner system 32 and redirected thereby for causing write and read laser beams 34, 36 to scan across the respective platens. The scanner system 32 includes a table 38 supported on a linear transport mechanism including parallel guides 40 carrying table mounted bearings for movement in a predetermined direction driven by lead screw 44 and rotary motor drive 46 which may be disposed on a suitable apparatus framework (not shown) so that the laser beam station and platens remain substantially fixed in space while the scan table moves along the direction indicated at 48.

The table carries a horizontal scanner subsystem 50 (FIG. 2) constructed in accordance with the present invention which shifts the beams from side to side (horizontally) as the table is carried forward to thereby develop raster scans 52, 54, of the laser beams across both the read and exposure platens.

Means are provided for generating a read laser beam 36 and preferably consists of a helium neon laser 58 having, for example, an output wave length of 6328 angstroms in the red position of the visible spectrum. The beam is then passed through beam expander and collimator 60 and turning mirror 62 along a predetermined path 66 and, after passing through dichromatic beam combiner 67 having surface selectively transmissive to 6328 angstroms a collimated beam 64 is produced.

A typical system for providing the exposure or write laser beam 34 which is actinically related to the photosensitive surface of the exposure plate carried at platen 22, utilizes an argon ion laser 68 having an output beam of a wave length, for instance of 4880 angstroms, in the blue portion of the spectrum at a power output of about 10 milliwatts. This output beam is passed through a known acoustic-optical modulator 74 which controls the strength of the beam transmitted therethrough. Exposure beam 34 is routed by a turning mirror 76 through a beam expander and collimator 78 to the dichromatic beam combiner 67 which passes as beam 64. The combiner 67 reflects from its frontside the collimated exposure laser beam of 4880 angstroms to combine the two laser beams along the common path 66. The laser path is fixed along a predetermined direction and is precisely maintained in space to intersect a turning mirror 80 carried on the scan table for directing the beam into the scanner apparatus of the present invention. As indicated in FIG. 1 the scanner apparatus 50 serves to deviate each beam through an angular horizontal amount. After passing optical lens 82 the laser beams pass a dichromatic beam splitter 84 which reflects the write laser beam 34 upwardly to a turning mirror 86 and then downward through passageway 88 in the table to expose platen 22. The dichromatic beam splitter 84 (similar to combiner 64) permits passage of the read beam 36 which proceeds thence to folding mirror 90 which deflects it through a second passageway 92 in the table to scan and impinge upon an original at read platen 26. The exposure platen and read platen are positioned at the optical focal plane of a flat field lens 82 when such a lens is used, so that the lens serves to focus the beams 34, 36 onto the respective platen.

Optical reader means 94 are provided and usually carried by the scan table. As the beams simultaneously scan across each platen the beam 36 incident on the copy positioned at the copy table is reflected into and read end-on by an exposed fiber optic bundle 96 which includes fibers stacked in an elongated linear array running across the width of the original to be scanned. The output of the fiber optic reader from the read platen is taken to a photomultiplier tube 12 and converted to an electric signal which is fed over a line 14 to the modulator 74 which controls the intensity of the output of modulator 74 and therefore the bright-dark signals of the laser beam 34 in accordance with the scanned informations of the original lying on the read platen 26.

Figure 3:
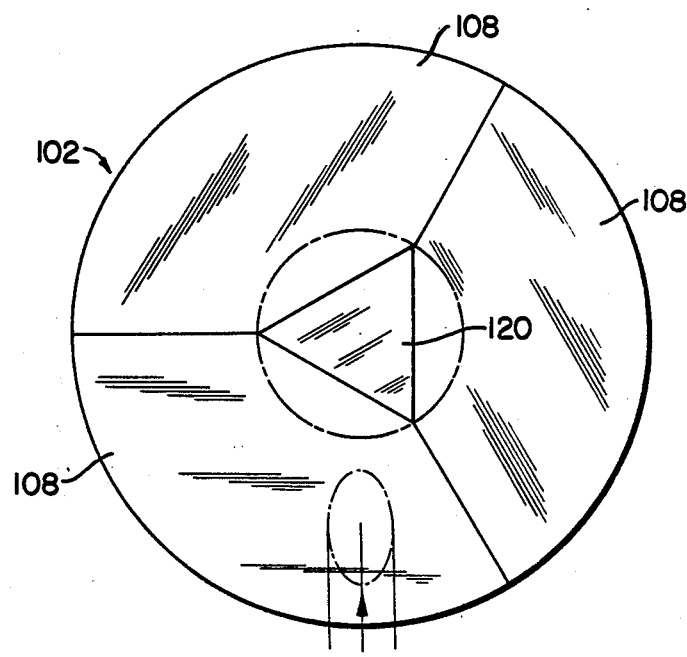
FIG. 3 is a front view of another embodiment of a scanner wheel in form of a faceted pyramidal spinner, which may be used instead of the planar scanner wheel in the apparatus shown in FIGS. 1 and 2.

Referring now to FIGS. 2 and 3 the optical scanner 50 of the present invention will be described in greater detail. In general the scanner consists of a roof mirror assembly 100 which is optically coupled to an input output scanner wheel 102 having a planar mirror surface 104 thereon which progressively moves through the laser beam path 66 and causes the laser beams to be deviated as will be described. The input turning mirror 80 is positioned to intercept the laser beam path 66 from the laser table and to deflect the laser beams upwardly onto the planar surface of the scanner wheel 102 at a convenient orientation. The beams are reflected from mirror 104 towards a first mirror 110 of the roof mirror assembly 100 back across to a second mirror 112 of the assembly and then are reflected back to the planar surface 104 from which they were first reflected. After the second reflection onto the planar surface 104 the laser beams are reflected once more towards the second mirror 112 and back across to the surface 104. For this last reflection, mirror 110 or one or one or more optional additional mirrors could have been used instead of mirror 112. The beams are then reflected again from 104 to the mirror 112. From this mirror the laser beams are reflected to mirror 110 from which they are reflected to the planar surface 104. After the fourth reflection on the planar surface 104 the laser beams emerge from the scanner assembly 50 in direction to the lens 82 and the dichromatic beam splitter 84.

The planar surface 104 is slightly off normality to the axis of rotation and the angle between the planar surface 104 and the plane of the scanner wheel 102 perpendicular to the axis of rotation is up to 6°. The arrangement is such that a half revolution of the scanner wheel 102 sweeps the incident laser beams 34, 36 in the horizontal plane through an angle equal to 16 times off-axis tilt of the planar surface 104 of the scanner wheel 102. The angle of reflection of the planar surface 104 and of the roof mirrors 110, 112 and turning mirror 80 define the orientation of the laser beams so that by appropriately positioning the location of these optics the beams may be adjusted so as to obtain free exit in the direction of the beam splitter 84.

Means are provided for mounting and aligning the roof mirrors 110 and 112 in spaced relation to each other and consists of a framework 116 and a base 114 to which the mirror 112 is carried in a support ring which is adjustable in angular orientation by a three point suspension consisting of suitable differential screws through an upper cross piece so as to permit accurate alignment between the mirrors.

In a preferred embodiment, the mirrors 110, 112 are positioned with an interposed angle of about 70° as in FIG. 2. The mirror 110 is positioned at an angle of approximately 28°, the mirror 112 at an angle of approximately 42° and the scanner wheel 102 at an angle of about 49° with the vertical in FIG. 2. These angles define a fixed angular relation between the desired output laser beams in vertical angular alignment with the objective lens, to the angle of alignment of input beams 34, 36.

A motor and shaft housing mounting 144 supports the scanner wheel in position so that the axis of rotation of the scanner wheel is aligned and in a plane corresponding with the optical axis of the output objective lens and the axis of the input laser beams all of which also define a plane in which the normal vectors defining the surfaces of the roof mirrors 110 and 112 also are made to lie by adjustment.

FIG. 3 shows an optional scanner wheel having front reflective surfaces conforming to a pyramid similar in shape to that of cross referenced U.S. patent application Ser. No. 805,455 which is incorporated herein by reference. The scanner wheel pyramid is preferably a regular triangular pyramid the apex portion of which is flattened at 120 and has an axis of symmetry and apex (imaginary) located along the axis of rotation. The pyramid thus defines a plurality of at least three reflective side segments 108 which are identical and make an angle about the axis of rotation of 120° to each other. Each of these segments is provided with a very accurately formed planar reflective surface. It is important that each segment be optically flat to a high degree of accuracy since the input and output reflections from the segment will generally not be at the same position to each reflective segment as the wheel rotates.

Each segment defines a plane in space which is tilted a predetermined angle (90°—½ of the apex angle) with respect to a vertical plane to the axis of rotation of the wheel. Since the segment passes through the beam path the effect is one of passing a plane through the path which plane varies in angle of orientation to the path.

Figure 4:
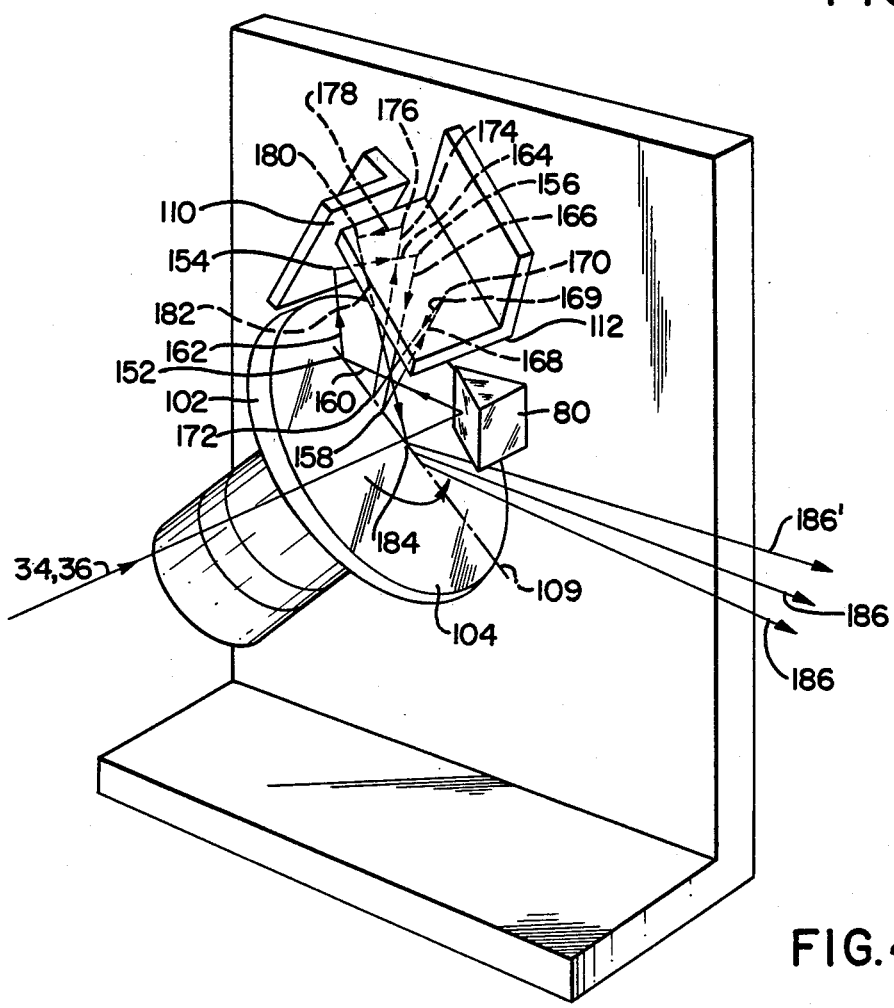
FIG. 4 is a perspective diagrammatic view illustrating the ray trace of the principal coincident beams through the scanner assembly at an intermediate angle of orientation of a scanner wheel, within the assembly, whereby the coincident beams are reflected more than once within the scanner assembly.

FIG. 4 illustrates schematically the ray trace of the laser beams and their three dimensional motion through the scanner assembly during scanning. The scanner assembly includes the scanner wheel 102 with the planar surface 104 tilted off axis through an angle of up to 6°. The different beam segments are characterized as follows: The beam segment 160 is stationary while the beam segment 162 underlies a horizontal and vertical angle of deviation at the first reflection at the point 152 on the planar surface 104. The beam segments 164, 166 are vertically and horizontally displaced due to the reflections at the points 154, 156 of the roof mirror doublet 110, 112. The beam segment 166 is reflected a second time from the planar surface 104 at point 158 thus producing as segment 168 in the direction of the mirror 112. At point 170 of mirror 112 the beam segment 169 is deflected to the planar surface 104, where it is reflected the third time at point 172. From there the beam segment 174 bounces at point 176 on the second mirror 112 and is reflected as beam segment 178 onto the first mirror 110 at point 180 and emerges as beam segment 182 for a fourth reflection at point 184 on the planar surface 104 to emerge the scanner assembly along the laser beam path 186.

The laser beams 34, 36 are deflected by 4n reflections on the planar surface 104 of the scanner wheel 102 and are reflected 2n times between the roof mirrors before emerging the scanner apparatus, where n is any integer. In other words, the present invention improves upon the scanner assembly as known from the cross-referenced U.S. patent application Ser. No. 805,445. In Ser. No. 805,445 and this invention the surface of the reflective segments of the scanner wheel introduce to the beam, as a result of the reflections from its surface, a total of four deviations of the laser beams. These are a horizontal angular deviation, a vertical angular deviation, a horizontal and a vertical displacement. The deviations have a constant vertical angular component which is invariable while the horizontal angular and displacement components progress from side to side in a repeating pattern.

In the scanner as known from Ser. No. 805,445, the deviation has a vertical displacement component which progresses up and down in a repeating pattern, while in the present invention this component is invariable. Hence the beams in this invention describe a horizontal, essentially flat, plane of light while the beam from the scanner Ser. No. 805,445 describes a horizontal, curved surface of light which must be flattened by another member of the optical train. This member is typically a lens interposed in the beam path such that its focus is at the apparent swivel point of the horizontal angular sweep of the beam.

It is known from U.S. patent application Ser. No. 805,445 that no vertical angular change in direction occurs from a beam passing through 90° mirror doublet as a function of a change in the angle of tilt of a reflector which serves both as input and output to the roof mirror. It is a known property of the roof mirror doublet itself that the input beam defines the angle of the output unambiguously and that a beam entering the doublet in a plane normal to the line of intersection of the roof mirror doublet will be reflected out at exactly the same angle as which is entered in the same plane. Because of this inversion and passing through the doublet the angular component of tilt of the input reflector is cancelled and only a displacement will occur.

The foregoing holds precisely correct in the arrangement shown in FIG. 4 wherein the laser beams are passing twice thorugh the roof mirror assembly. Due to the passing of the laser beams between the roof mirrors twice, the laser beams are reflected out without an appreciable periodic vertical displacement.

The paths 186' and 186" in FIG. 4 show the horizontal angular deviation of the common path 186 of the reflected laser beams.

Figure 5:
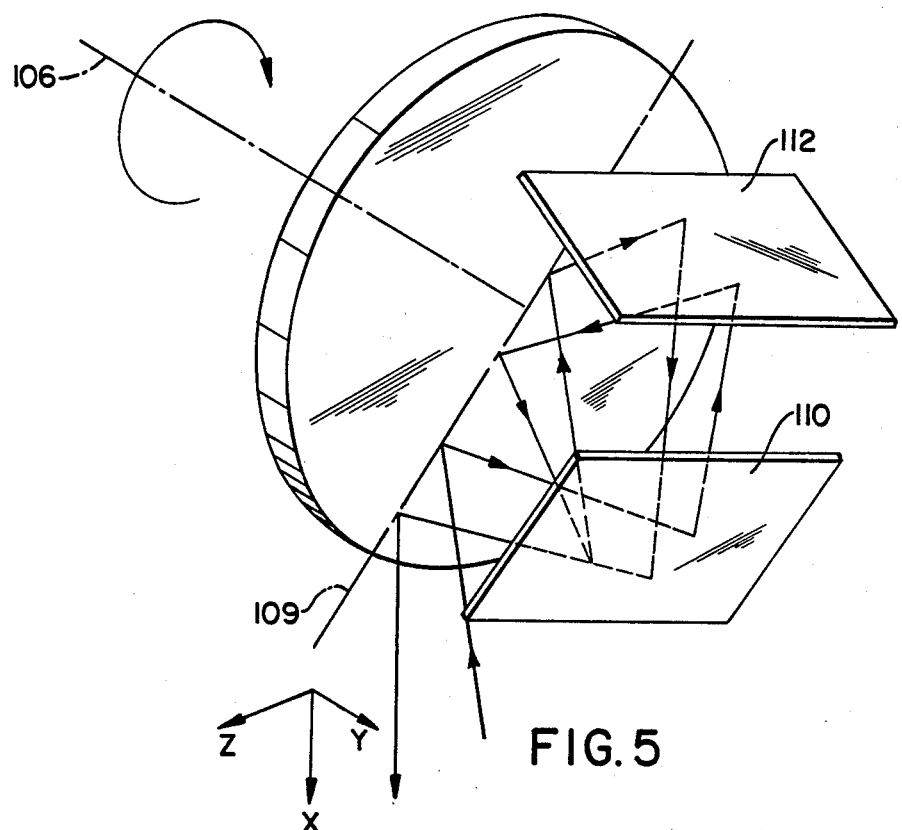
FIGS. 5 and 6 show diagrammatic views illustrating the principle by which parallel displacement is cancelled from the coincident laser beams as they pass through a roof mirror arrangement and the scanner wheel of the scanner assembly used in the present invention.

FIG. 5 illustrates a schematic view of a scanner assembly with a planar surface 104 of the scanner wheel 102. The scanner has by way of example the following dimensional characteristics. The planar surface 104 is tilted 4° from the plane perpendicular to the axis of rotation 106 which is in the direction of the y-axis. The plane perpendicular to the axis of rotation is parallel to the x-z plane. The entering laser beams are approximately 40° off axis.

As the scanner wheel 102 rotates through 120° common laser beams sweep 32° in the x-z plane, but are displaced in x-y plane by only 0.140% distance between the first and the fourth reflection onto the planar surface 104. This is a lesser distance than in known scanner assemblies in which this displacement in the x-y plane can be up to 12% of distance between the first and last reflection onto the reflective segment of the scanner wheel. FIG. 4 indicates that the points of reflection on the surface 104 lie on a line 109.

An advantage of the scanner wheel 102 having the planar surface 104 is the extreme simplicity of the production of such a planar spinner. In the embodiment of the scanner assembly using the multifaceted pyramidal spinner there exists the advantage that the sweep angle amplification is increased compared to known scanner assemblies, because the amplification is proportional to the number of times which the laser beams are reflected off the scanner wheel, i.e., the pyramidal spinner, during one revolution of the spinner. The increased angle amplification allows use of a less peaked pyramid which is less susceptible to centrifugal distortion at high rotational speeds and is easier to fabricate.

Figure 6:
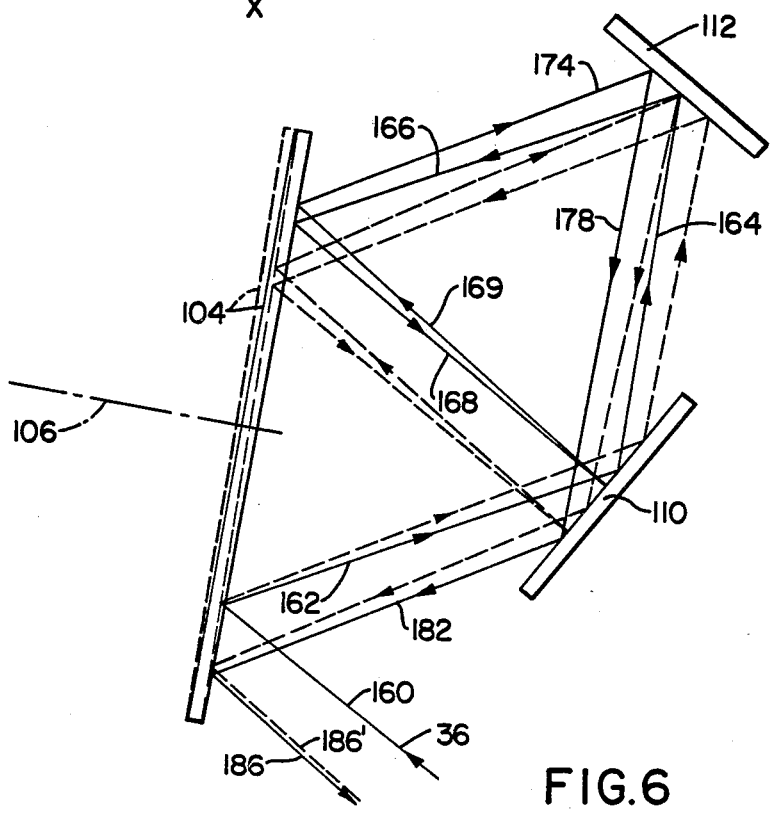

FIG. 6 illustrates in a schematic view the beam path through the scanner assembly. The laser beam segment 160 defines an angle of 65° with the planar surface 104 of the scanner wheel which is not shown. The mirrors 110, 112, of the roof mirror assembly are positioned with an interposed angle of about 90°. The upper mirror 112 forms a 4° angle with the horizontal plane; the lower mirror 110 forms a 50° angle with the horizontal plane, while the planar surface 104 has a tilt angle of 80° against the horizontal plane and tilt off angle of 1° from the plane perpendicular to the axis of rotation 106. The angle between the beam segments 168 and 169 amounts to about 2°.

There is also shown, as a dotted line, the beam path for a change of 1° in the angle of tilt of the planar surface 104. The sweep angle is about 8° between the emerging laser beam paths 186 and 186', for the foregoing stated change of 1° in the angle of tilt.

The vertical displacement between the paths 186 and 186' is nearly cancelled and is only 0.0306 of the half path length, e.g. 2 mil in 6 inches.

It is a particular advantage of the embodiment shown in FIGS. 2, 4, 5 and 6 that the scan wheel can be cut from a circular disc by fabricating only one planar surface. It is evident that a circular disc having an accurately machined and aligned mounting to the shaft of its rotational support is essential for vibration free operation. Achieving this result in circular configuration is relatively easy and at the speeds of operation contemplated in the present invention (770 rpm and greater) freedom from vibration is essential to assure mechanical stability and the ability to operate at such speeds without having stresses introduced in the parts beyond that which they could reasonably be expected to bear. Careful manufacture of the wheel and rotating parts must result in a substantially symmetrical mass distribution about the axis of rotation and must permit the achieving of a high degree of dynamic balance of the rotational elements.

While operating speeds have been indicated as capable of up to 7,000 rpms, the inherent design of the scanner of the present invention permits envisioned operating speeds which may reach or even exceed 60,000 rpms. This would represent linear trace repetition times of up to 3,000 traces (scans) per second which have heretofore been unavailable in apparatus of this character. The trace times provided by the present invention essentially eliminate the scanning element as the limiting structure in apparatus for the production of printing plates and the like. The scanning system of the present invention has achieved many of the desirable advantages which are essential to a good scanner. Effectively, vertical wobble has been eliminated. While scan efficiencies of at least 75% are easy to obtain, the scan efficiency can be increased by increasing the diameter of the scanning wheel at least up to reasonable dimensional limits. Scan times for conventional printing plates with typical raster scan advance speeds and the trace speeds disclosed in connection with the present invention are within a one minute time frame.

The characteristics of the multifaceted scanner wheel used in the scanner assembly of the invention are disclosed in the U.S. patent application Ser. No. 805,445 and are incorporated in this application by reference.

The present system contemplates use in multifrequency operation where read and write beams of different frequency are superimposed along a common single beam path. The system is also adaptable to facsimile operations such as disclosed in the co-referenced U.S. patent applications Ser. No. 695,921 and Ser. No. 805,373. The angular position of the wheel may be determined either by the design of the encoder disc or by spatial masking within the facsimile system. The scanner assembly is readily incorporated in the flat field type scanning device as shown in FIG. 1.

While the invention has been particularly shown and described with reference to preferred embodiments thereof, it will be understood by those skilled in the art that various changes in form and detail may be made therein without departing from the spirit and scope of the invention.

What is claimed is:

1. Beam scanner apparatus which comprises (a) rotatable reflective means having an axis of rotation normal thereto; and
(b) at least one planar reflective segment positioned on said reflective means at a tilt angle which is off normal to said axis of rotation; and
(c) means for rotating said reflective means about the axis of rotation; and
(d) a roof mirror arrangement which comprises a first planar reflective surface and a second planar reflective surface, said first and second reflective surfaces are disposed in fixed positions relative to each other and said reflective means; and
(e) means for supporting said reflective means in the path of a light beam such that said beam is reflected 4n times by said reflective means and 2n times between said first and second reflective surfaces before said beam emerges from said optical scanner apparatus, wherein n is any integer.

2. The apparatus of claim 1 wherein said reflective segment defines an angle of tilt of up to 6° with a plane perpendicular to said axis of rotation.

3. The apparatus of claim 1 in which the first reflective surface defines an angle of about 80° and the second reflective surface defines an angle of about 10° with said reflective segment.

4. The apparatus of claim 1 further comprising means for receiving said beam from said reflective means and directing said beam back toward said reflective means after 2n reflections from said reflective means.

5. The apparatus of claim 1 or 2 wherein the angle between said first reflective surface and said second reflective surface is from about 50° to 90°.

6. The apparatus of claim 1 wherein n=1 or 2.

7. The apparatus of claim 1 having a plurality of reflective segments positioned on said reflective means.

8. The apparatus of claim 7 wherein said reflective segments are arranged in the form of a pyramid with each segment having an equal apex angle and wherein the height of said pyramid is less than the diameter of said reflective means.

9. The apparatus of claim 8 wherein there are 3 reflective segments.

10. A laser read/write apparatus for causing a read laser beam to scan input copy and for causing a write laser beam to simultaneously scan an exposure plate comprising means for forming a read laser beam, means for forming a write laser beam, means for aligning and combining said beams along a collimated beam path in space; scanning means positioned in said combined beam path for imparting a repeating horizontal deviation to said combined beam which comprises:
(a) rotatable reflective means having an axis of rotation normal thereto; and
(b) at least one planar reflective segment positioned on said reflective means at a tilt angle which is off normal to said axis of rotation; and
(c) means for rotating said reflective means about the axis of rotation; and
(d) a roof mirror arrangement which comprises a first planar reflective surface and a second planar reflective surface, said first and second reflective surfaces are disposed in fixed positions relative to each other and said reflective means; and
(e) means for supporting said reflective means in the path of said laser beam such that said beam is reflected 4n times by said reflective means and 2n times between said first and second reflective surfaces before said beam emerges from said scanning means wherein n is any integer; and
beam splitter means adapted to receive said beam from said scanning means and for separating said read and write beams and directing said read beam toward a first scan station and said write beam toward a second scan station; said first scan station being adapted for receiving copy to be scanned by said read beam and containing means for sensing light reflected from said copy; said second scan station is adapted for receiving light responsive means; and means for modulating the intensity of said write laser beam in response to said light sensing means; and means for causing said read and said write laser beams to simultaneously sweep said first and said second scan stations in the direction perpendicular to a laser light line formed on said scan stations.

11. The apparatus of claim 10 wherein said reflective segment defines an angle of tilt of up to 6° with a plane perpendicular to said axis of rotation.

12. The apparatus of claim 10 in which the first reflective surface defines an angle of about 80° and the second reflective surface defines an angle of about 10° with said reflective segment.

13. The apparatus of claim 10 further comprising means for receiving said beam from said reflective means and directing said beam back toward said reflective means after 2n reflections from said reflective means.

14. The apparatus of claim 10 wherein the angle between said first reflective surface and said second reflective surface is from about 50° to 90°.

15. The apparatus of claim 10 wherein n=1 or 2.

16. The apparatus of claim 10 having a plurality of reflective segments positioned on said rotating reflective means.

17. The apparatus of claim 16 wherein said reflective segments are arranged in the form of a pyramid with each segment having an equal apex angle and wherein the height of said pyramid is less than the diameter of said rotating reflective means.

18. The apparatus of claim 17 wherein there are 3 reflective segments.

19. The apparatus of claim 10 or 11 wherein said first and said second scan stations are located at the focal point of a lens positioned in the beam path between said scanner means and said beam splitter means.

* * * * *